Feb. 27, 1962 A. E. BRENNEMANN 3,023,325

CRYOGENIC COMMUTATOR

Filed Dec. 24, 1957

INVENTOR.
ANDREW E. BRENNEMANN

BY

Brumbaugh, Free, Graves & Donohue his ATTORNEYS.

United States Patent Office 3,023,325

Patented Feb. 27, 1962

3,023,325

CRYOGENIC COMMUTATOR

Andrew E. Brennemann, Poughkeepsie, N.Y., assignor to International Business Machines Corporation, New York, N.Y., a corporation of New York Filed Dec. 24, 1957, Ser. No. 704,940
6 Claims. (Cl. 307—88.5)

This invention, generally, relates to commutator circuitry and, more particularly, to a new and improved cryogenic commutator.

In the past, many attempts have been made to develop rapid switching of reading apparatus over a plurality of points to be read. However, the speeds and versatility of such switching devices have not kept pace with that of those developed for use in other fields, such as, for example, modern computer systems and the like.

With the advent of superconductive circuit devices, that is, devices which advantageously utilize the characteristic of certain materials to exhibit no measurable electrical resistance at temperatures in the vicinity of absolute zero, attempts have been made to develop improved switching and/or commutator circuits to achieve heretofore unobtainable switching functions. One of the first superconductor devices developed for use as an operative component in electrical circuits is termed a cryotron and comprises a gate conductor of superconductor material and a control conductor arranged in magnetic field applying relationship with the gate conductor. The gate conductor is maintained at a temperature at which it is superconductive and may be switched to a resistive state by energizing the control conductor to apply a magnetic field of sufficient intensity, and under certain conditions, this switching may be accomplished at a very rapid rate.

Accordingly, it is an object of this invention to provide an electrical circuit whereby superconductive elements are utilized as operative components.

Another object of the invention is to provide a commutator circuit employing superconductive components.

Still another object of this invention is to provide a new and improved cryogenic commutator circuit.

A further object of this invention is to provide an electrical circuit including cryogenic components to permit the selective sensing of electrical conditions at a plurality of points at a rapid rate.

A still further object of this invention is to provide a new and improved commutator circuit whereby superconductive elements are arranged as operative circuit components to achieve greater switching speeds.

Generally, the invention contemplates locating one or more sensing elements as, for example, thermocouples, strain gauges, or the like in desired positions to permit each sensing element to develop an electrical voltage which is representative of a condition to be sensed. At least one superconductive element is connected electrically across each sensing element such that when the superconductive element is rendered resistive by the magnetic effect of a winding positioned in inductive relation therewith, a voltage is developed across the superconductive element, which voltage is indicative of the sensed condition. Due to the substantially zero resistance of a superconductive element in the absence of the magnetic field, a plurality of similarly connected superconductive elements may be arranged in series across the input to a suitable amplifier for actuating an indicating or recording apparatus. A current pulse applied to each winding successively will switch each superconductive element successively so that the voltages developed by each sensing element may be read one at a time. The successive current pulses may be selectively applied to any one or more of the windings individually, or repeatedly in accordance with a predetermined sequence, or, if desired, under control of a random access addressing system.

The invention consists in certain novel features of circuit arrangement and in the combination and arrangement of circuit components as will be hereinafter more particularly pointed out and more fully described and referred to in connection with the accompanying drawings wherein.

Figures 1, 2, 3, 4:
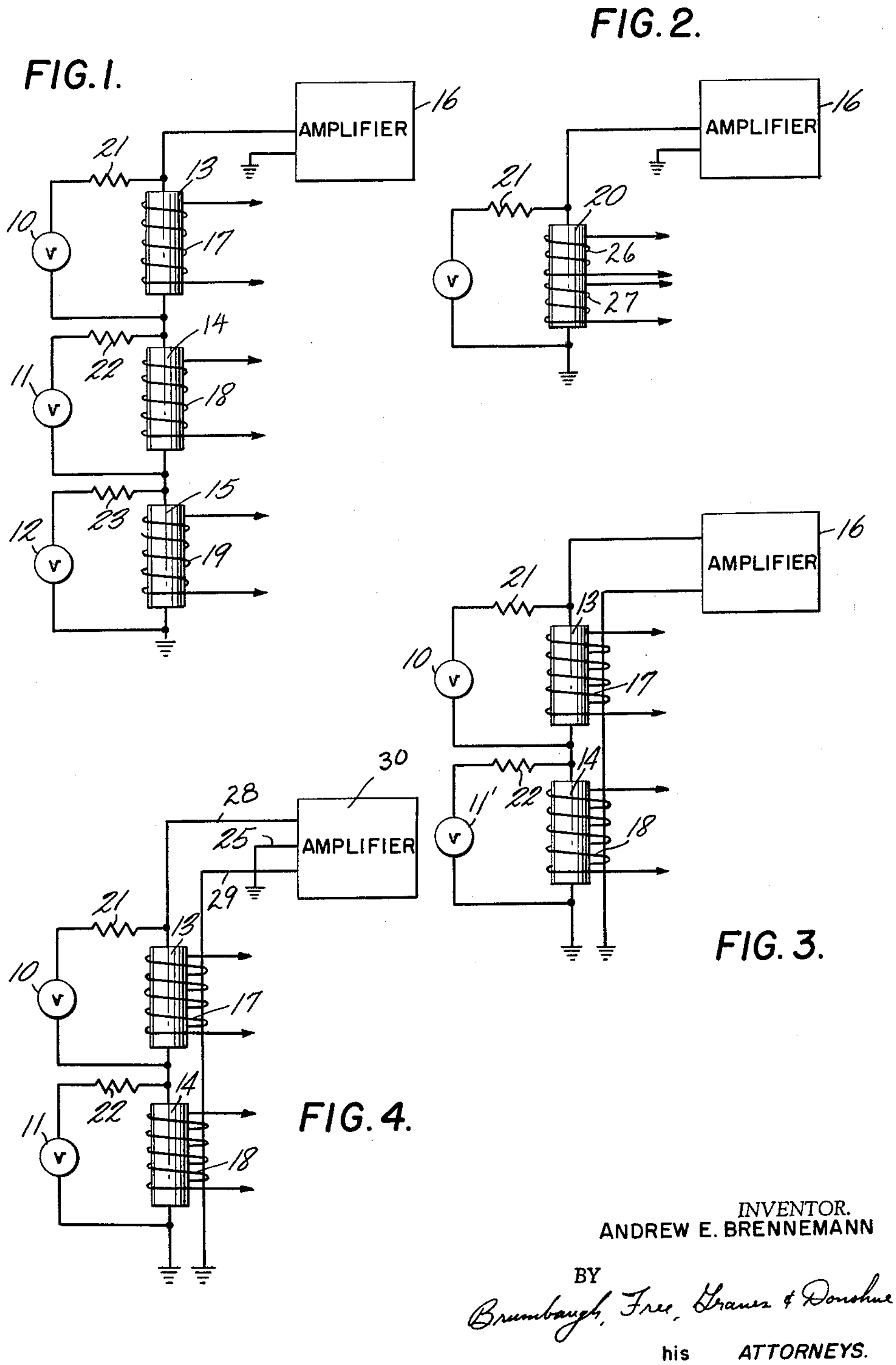
FIGURE 1 shows diagrammatically one circuit arrangement embodying the principles of the invention.
FIGURE 2 shows diagrammatically one element of the circuit shown in FIGURE 1 which has been modified to be operative in response to coincident pulses.
FIGURE 3 shows diagrammatically a circuit similar to that shown in FIGURE 1 wherein the return lead of the amplifier input is also coupled by the control windings.
FIGURE 4 shows diagrammatically a circuit similar to that shown in FIGURE 1 in which the amplifier input has been modified to receive a differential input pulse.

Referring now to a representative embodiment of the invention as shown in FIGURE 1 of the drawings, the numerals 10, 11 and 12 show, respectively, three sensing elements, each being adaptable for producing an electrical voltage which is representative of a desired characteristic, condition or function. For the purposes of the invention, these voltages may be developed by any suitable means as, for example, by thermocouples, strain gauges, or any other suitable device capable of producing a voltage which is representative of a condition to be sensed. The particular number of sensing elements shown in the drawings and referred to in the description to follow is for illustration purposes only, and while the principles of the invention are uniquely adaptable to a great number of sensing elements, they are also adaptable to a single sensing element.

As shown in FIGURE 1, superconductive elements or "cryotrons" 13, 14 and 15 are connected across the sensing elements 10, 11 and 12, respectively, such that a voltage appearing across a selected cryotron will be indicative of the magnitude of a voltage developed by the associated sensing element. The cryotrons 13, 14 and 15, in turn, are connected in series across the input of a suitable amplifier 16 which amplifies a voltage applied to its input to actuate a suitable indicator or recorder (not shown). Thus it may be seen that with each of the cryotrons 13, 14 and 15 in its respective superconductive state, each of the sensing elemnts 10, 11 and 12 will be shorted and, therefore, the voltage input to the amplifier 16 will be zero.

Each cryotron 13, 14 and 15 is capable of being switched individually to its normal or resistive state by the application of a magnetic field developed by windings 17, 18 and 19 positioned in inductive relation with each cryotron 13, 14 and 15, respectively. In this manner, each of these cryotrons may be switched individually from its superconductive state to its normal or resistive state and back again simply by controlling the associated magnetic field.

The value of each respective resistance 21, 22 and 23 of each series circuit loop is selected to limit the short-circuit current flow when its associated cryotron is in the superconductive state such that the short-circuit current flow will not be a value sufficient to switch the cryotron to its resistive state. Therefore, the voltage which appears across any one of the cryotron elements may not necessarily be equal to the voltage developed by the associated sensing element. However, it will be at least indicative of such voltage and, by appropriate adjustment of the scale of an indicating or recording device, the magnitude of the true voltage may be obtained.

To switch the cryotrons 13, 14 and 15 successively to the normal or resistive state, a pulse of control current is applied successively to the windings 17, 18 and 19 from any suitable source such as, for example, a computer. The magnitude of the current pulse need be only sufficient to switch the cryotrons, successively, to the resistive state, and the duration of the current pulse can be extremely short, the only limit being the time required by the amplifier 16 or other device to make the desired reading. Rapid reading of such information may be accomplished by any of the electronic or other devices well known in the art.

In operation, assume that the sensing elements 10, 11 and 12 are positioned to develop, respectively, a voltage representative of a condition at desired points. To read the values of these voltages rapidly, it is necessary to apply current pulses rapidly to each of the windings 17, 18 and 19, successively. As a current pulse is applied, for example, to the winding 17, the cryotron 13 is switched to its normal or resistive state and the voltage appearing across the cryotron 13 will be indicative of the voltage developed by the sensing element 10. Since the cryotrons 14 and 15 remain in their superconductive states because the windings 18 and 19 are not pulsed, the voltages developed by the sensing elements 11 and 12, respectively, will be shorted, and the voltage applied to the input of the amplifier 16 will be equal to that developed across the cryotron 13. In like manner, when the control pulse applied to the winding 17 is removed and then applied to the winding 18, the voltage appearing across the cryotron 14 will be indicative of the voltage developed by the sensing element 11 and, since the cryotrons 13 and 15 are superconductive, this voltage across the cryotron 14 will be the only voltage applied to the input of the amplifier 16.

Thus, from a circuit arrangement as described in detail above, the true value of a voltage at any number of selected sources is obtained rather than simply a yes-no type of indication, and since these voltages may be obtained at an extremely rapid rate, their relative values present a more useful indication when coincident results are desired.

In some instances, it is desired to control each cryotron with two windings as shown in FIGURE 2 of the drawings. In this manner, each winding, identified in FIGURE 2 as 26 and 27, respectively, is of a sufficient number of turns such that a pulse of current to any one winding will produce a magnetic field slightly more than one-half of the field required to switch the associated cryotron to its normal or resistive state. Though the windings 26 and 27 are shown separately for the sake of clarity of illustration, they are actually arranged in either interleaved or superimposed fashion around the gate conductor so that the fields produced when both are coincidently energized are essentially superimposed. Therefore, coincident pulses to each of the windings 26 and 27 will be sufficient to switch the cryotron 20 to its resistive state. Otherwise, this circuit operates in the same manner as that just described in connection with FIGURE 1.

The circuit shown diagrammatically in FIGURE 3 is substantially the same as that shown in FIGURE 1 with the exception that the ground return lead to the amplifier 16 is also linked by each winding 17 and 18 on the cryotrons 13 and 14, respectively. This arrangement is to minimize noise effects by reducing inductive coupling between the input circuit loops and the output or sense circuit loop.

FIGURE 4 shows a further modification of the circuit shown in FIGURE 3 by providing a push-pull input amplifier 30 to receive each respective sensed voltage. In this arrangement, the center lead 25 of the input to the amplifier 30 is used for the ground return, and the leads 28 and 29 provide a cancelling effect of any transient or A.C. voltages induced by current pulses applied to the control windings 17 and 18, respectively, or as the result of changes in the voltages of sources 10, 11. This arrangement has the advantage of providing a ground return connection at the amplifier 30 itself rather than feeding the ground return back through the coils 17 and 18 as in the case of the circuit shown in FIGURE 3. Unwanted inductive effects may be also minimized by arranging the circuit loops so that each portion of each input loop circuit arranged within the associated control winding or windings includes adjacent wires or gate conductors in which the loop current from the associated source flows in opposite directions.

It should also be noted that, though wire wound cryotrons have been employed in the embodiments of the invention herein disclosed by way of illustration, the invention may also be practiced using thin film cryotrons of the type shown and described in copending application Serial No. 625,512 filed November 30, 1956, in behalf of Richard L. Garwin and assigned to the assignee of this invention.

It is to be understood that the above described arrangements are simply illustrative of the application of the principles of the invention. Numerous other arrangements may be readily devised by those skilled in the art which will embody the principles of the invention and fall within the spirit and scope thereof.

I claim:

1. Apparatus comprising, a voltage source, a cryotron gate element connected in a first circuit with said source, voltage-responsive means connected in a second circuit with said gate element to sense the presence of voltage developed by said source across said gate elment when the latter is resistive, and inductor means coupled by a first inductive coupling with said gate element and by a second inductive coupling with a current conductive portion of said second circuit other than said gate element, said first and second couplings being adapted in response to current applied to said inductor means to induce in said gate element and in said portion respective voltages which oppose each other in said second circuit, and said first coupling being further adapted in response to said current to change said gate element from a superconductive to a resistive state.

2. Apparatus as in claim 1 in which said second circuit is in the form of a single current loop.

3. Apparatus as in claim 1 in which said voltage-responsive means has a push-pull input by which such means is included in said second circuit, and in which said gate element and said second circuit portion are connected to opposite sides of said push-pull input.

4. Apparatus comprising, a sensing element responsive to a variable value condition sensed thereby to produce a variable voltage of which the value is a measure of that of said condition, a cryotron gate element connected in a first circuit with said sensing element, voltage-responsive means connected in a second circuit with said gate element to sense the value of the voltage developed by said sensing element across said gate element when the latter is resistive, and inductor means coupled by a first inductive coupling with said gate element and by a second inductive coupling with a current conductive portion of said second circuit other than said gate element, said first and second couplings being adapted in response to current applied to said inductor means to induce in said gate element and in said portion respective voltages which oppose each other in said second circuit, and said first coupling being further adapted in response to said current to change said gate element from a superconductive to a resistive state.

5. Apparatus comprising, a plurality of cryotron gate elements connected in series, a plurality of voltage sources of which each is connected with a respective one of said gate elements in a loop circuit respective to that source and gate element, voltage responsive means connected in an output circuit with and across the series combination of said gate elements to sense the presence of the voltages developed in said series combination by said sources when the gate elements respective thereto are rendered resistive, and a plurality of inductor means of which each is respective to one of said gate elements, and of which each is coupled by a first inductive coupling with its associated gate element and by a second inductive coupling with a current conductive portion of said output circuit other than said series combination, the first and second couplings of each inductor means being adapted in response to current applied thereto to induce in the associated gate element and in said portion respective voltages which oppose each other in said output circuit, and the first coupling of each inductor means being further adapted in response to current applied thereto to change the associated gate element from a superconductive to a resistive state.

6. Apparatus comprising, a plurality of cryotron gate elements connected in series, a plurality of sensing elements of which each is connected with a respective one of said gate elements in a loop circuit respective to that source and gate element, and of which each is responsive to a variable value condition sensed thereby to produce a variable voltage of which the value is a measure of that of said condition, voltage-responsive means connected in an output circuit with and across the series combination of said gate elements to sense the values of the voltages developed within said series combination by said sensing elements when the gate elements respective thereto are rendered resistive, and a plurality of inductor means of which each is respective to one of said gate elements, and of which each is coupled by a first inductive coupling with its associated gate element and by a second inductive coupling with a current conductive portion of said output circuit other than said series combination, the first and second couplings of each inductor means being adapted in response to current applied thereto to induce in the associated gate element and in said portion respective voltages which oppose each other in said output circuit, and the first coupling of each inductor means being further adapted in response to current applied thereto to change the associated gate element from a superconductive to a resistive state.

References Cited in the file of this patent

UNITED STATES PATENTS 2,832,897 Buck ------------------ Apr. 29, 1958

OTHER REFERENCES

Proceedings of the I.R.E., April 1956, pp. 482–493.

Proceedings of the Joint Computer Conference, Dec. 10–12, 1956, pp. 115–120.

"A Cryotron Catalog Memory System" by Slade and McMahon, "Proceedings of the Eastern Joint Computer Conference," Dec. 10–12, 1956, pp. 115 to 120.